Figure 1:
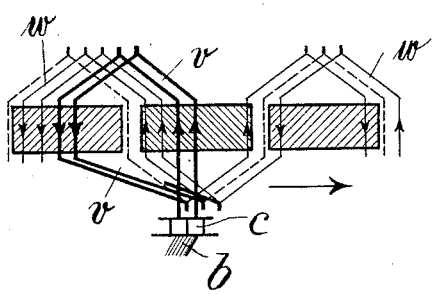

R. RICHTER.
ARMATURE WINDING FOR ELECTRICAL MACHINES WITH COMMUTATORS.
APPLICATION FILED AUG. 7, 1906.

1,072,036.

Patented Sept. 2, 1913.

UNITED STATES PATENT OFFICE.

RUDOLF RICHTER, OF CHARLOTTENBURG, GERMANY, ASSIGNOR TO SIEMENS-SCHUCKERT-WERKE, G. M. B. H., OF BERLIN, GERMANY, A CORPORATION OF GERMANY.

ARMATURE-WINDING FOR ELECTRICAL MACHINES WITH COMMUTATORS.

1,072,036.   Specification of Letters Patent.   Patented Sept. 2, 1913.

Application filed August 7, 1906.   Serial No. 329,564.

*To all whom it may concern:*

Be it known that I, RUDOLF RICHTER, a subject of the Emperor of Germany, and a resident of Charlottenburg, Berlin, Germany, have invented new and useful Improvements in Armature-Windings for Electrical Machines with Commutators, of which the following is a specification.

The present invention relates to improvements in armature windings for electrical machines with commutators.

Electrical machines for commutators for continuous current, as also for alternating current, frequently have connecting pieces of high resistance between the segments of the commutator and the proper point of connection with the armature windings, whereby the local currents flowing under the brushes in the case of short-circuit are weakened, the sparking thus being diminished and consequently the heating of the commutator being reduced. This purpose may be hereby obtained by selecting optionally high resistances for the connecting pieces up to any desired degree, but the ohmic losses caused therein by the main current passing same grow with these resistances. Moreover there is frequently not sufficient room for an open arrangement of the resistance in the armature and it is then necessary to arrange the resistances, which are generally bifilar, *i. e.*, turned back on themselves, in the grooves of the armature. Much angular space is thus required and the temperature of the armature is increased without compensating for the same by a corresponding advantage.

The invention refers in particular to a method of disposing the resistances above referred to in such a manner on the armature that the losses caused by these resistances are compensated. The details of the construction and the manner in which the compensation takes place are clearly described in the following specification with reference to the accompanying drawings in which:

Figures 1, 2, 3, 4 and 5 show examples of the winding diagrammatically.

Similar letters of reference refer to similar parts in all views.

In Figs. 1 to 5 the portion of the armature winding of a motor is shown diagrammatically in such a manner that the windings represented in these diagrams are understood to be the portions of the cylindrical armature surface developed into a plane surface, as is customary in the diagrammatical illustration of armature windings. The rectangular cross-hatched portions represent the pole faces, the arrows the direction in which the armature moves relatively to the poles. While the drawings only show how the structure may be disposed in a motor armature, it will be evident to everyone skilled in the art that it may be also disposed in a generator armature, and that it may be employed to the same advantage in direct as well as in alternating current machines in the manner hereinafter described.

Figure 2:
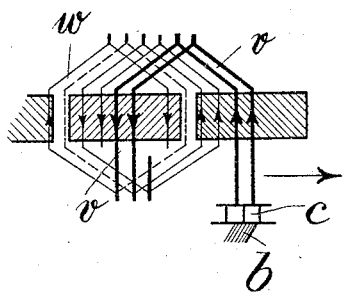

Fig. 2 shows the nature of the arrangement most perspicuously. The loop winding $w$ which is indicated by a few turns and the short circuited coil of which is shown in dotted lines, has the pieces $v$ connected to the points, which are ordinarily connected to the commutator segments $c$. Only two of such additional pieces or conductors $v$ are shown completely in the figure in heavy lines. As is seen the connecting pieces are led in a complete turn or coil to the segments of the commutator and in the present example particularly so that both sides are distant from one another the pitch of the coil. The current is conducted in the direction of the arrow by the brush $b$, which at the time short-circuits the dotted main armature coil, by means of the connecting pieces $v$ $v$ and flows divided through these conductors $v$ $v$, owing to their location relatively to the poles in such a manner that they coact with the armature coils. (The surfaces of the poles are indicated in the usual manner by cross-hatching *i. e.* from the upper left hand portion to the lower right hand portion indicates North Pole, the reverse indicates South Pole.) The conductors $v$ as arranged act thus as additional active conductors of the armature when the brush short-circuit occurs and they actually produce thereby a torque, for instance in case of a motor armature; besides these conductors act simultaneously as bifilars and thus practically as non-inductive resistances of the main winding where same is short-circuited. Thus the superiority of the arrangement evidently consists in the employment of short-circuit resistances which, owing to their simultaneous action as active conductors during the brush short-circuit produce a compensation for the ohmic loss caused by the resistance.

As the current in the short-circuited circuit "under the brushes" is to be diminished as much as possible by the resisting conductors, the latter must be so arranged that no electro-motive force is induced in the short-circuited circuit which would increase the short-circuit current. Therefore contrary to Sayer's known winding the resistance conductors are so disposed, according to the present invention, that equal electromotive forces are induced in them which neutralize each other in the short-circuited circuit.

The winding produced in the manner described may thus be considered as consisting of the main winding and an additional winding, which may consist of only one conductor but which assumes the character of an additional effective winding all the more, the more turns each separate element $v$ consists of; for obviously in the place of a single turn shown in Fig. 2, as many turns as desired may be employed for every connecting conductor $v$ without changing the scope of the above explanation. Now as the additional turning moment thus gained obviously increases with the number of turns of the connecting conductor $v$, it is preferable to use as good conducting material as possible and produce the necessary resistance by diminishing its cross-section; therefore in order to utilize the given space in the armature grooves to the best advantage preferably copper might be used contrary to the other materials used hitherto in the ordinary known short-circuit resistances. Accordingly several turns will be used generally for the elements $v$.

The above said may be readily applied to a wave-winding, as Fig. 1 shows, in which, like in the following figures, the same designations are chosen as in Fig. 2. Here, as in the following examples it clearly follows moreover, that the pitch of the additional winding must not necessarily be equal to that of the main winding, and that the additional windings do not have to be located necessarily symmetrically to the central zone. But, on the other hand, the additional winding may be preferably so formed that the same templet for winding may be used for it as for the main winding.

Figure 3:
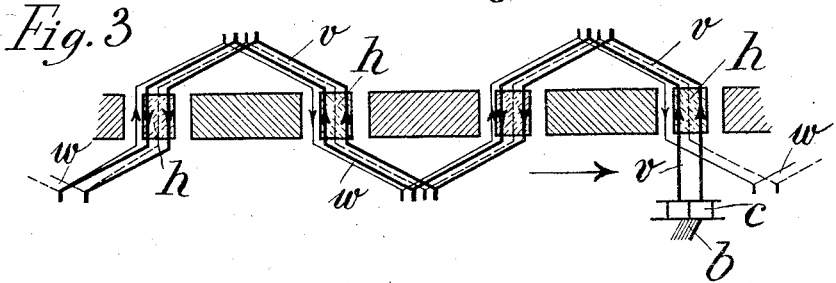
Figure 4:
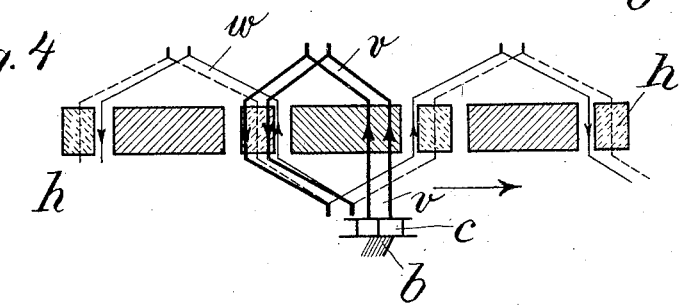
Figure 5:
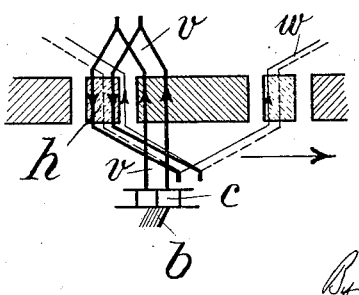

Fig. 3 shows a wave-armature winding of a machine with auxiliary poles $h$ (between the main poles), in which again a few turns of the main winding $w$ are shown having two connecting pieces $v$ which are likewise wound as wave-winding. These connecting pieces $v$ in their active position over the auxiliary poles as shown in the figures have a strengthening effect on the torque as already described and as may be seen in the diagram simultaneously a strengthening effect on the main poles, so that in certain cases the exciting winding of the latter may be superfluous. If however, like in certain alternate current motors with commutators, the phase of the auxiliary field is displaced $\frac{1}{4}$ period against the phase of the main field or armature current, in the position of the connecting pieces $v$ shown in Fig. 3, of course no strengthening of the torque takes place, but an increase of the load factor. Also in case the main winding is constructed as wave-winding, the additional winding may on its part have the character of a loop winding, as Fig. 4 shows. Also here the pitch of the coils of the winding $v$ is so chosen that an increase of the torque or of the efficiency as well as of the load factor is obtained, both of course in a correspondingly less degree than if the pitch of the coils $v$ were intended for the one or other purpose alone. Obviously the purpose intended by the connection according to Fig. 4 may also be obtained by a substantially shortened pitch of the coil of the additional winding $v$, as Fig. 5 indicates.

In some instances the proportion of both windings may be so determined that the main winding loses its character as such, and the additional winding preponderates in the total effect. This, however, being merely a matter of dimensioning the number and thickness of the windings, has been omitted in the illustration, since it does not constitute a departure from the former arrangement and scope of the invention shown in the several figures. Indeed the winding denoted as the main winding may be even entirely omitted, for example in cases where the question of good utilization of the material is less important than sparkless working and high starting torque, without however departing from the scope of the above disclosure. The manner in which the windings are disposed in the latter instance being also merely a matter of detail construction and obvious to anyone skilled in the art, detail illustration thereof has been also omitted, since it does not form a modification of the general arrangement of resistances described and claimed.

As described and illustrated, the general idea of the invention may be reduced to practice in various manners, the essential point being in every instance that the elements $v$ of the coil should be so disposed that they will always form non-inductive resistances when the armature coil is in the short-circuited position and that they act simultaneously as active conductors.

Having thus described my invention, what I claim as new and desire to secure by Letters Patent is:

1. In an electric machine, the combination of field poles, armature coils, their respective commutator segments, and additional resistance coils of suitable pitch on said armature forming the connecting conductors between said armature coils and their respective commutator segments, said resistance coils having their opposite sides located apart at different points of the periphery of the armature at which the two corresponding sides of two adjacent resistance coils are subject to the same strength of opposite fields of said field poles when said coils are short circuited by the brushes, whereby equal electro-motive forces are induced in the corresponding sides of said adjacent resistance coils which neutralize each other in the short circuit, whereby owing to the high resistance of these coils commutation is aided and whereby these resistance coils assist the armature coils as active conductors.

2. In an electric machine the combination of main field poles, auxiliary poles, armature coils, their respective commutator segments and additional resistance coils of suitable pitch on said armature forming the connecting conductors between said armature coils and their respective commutator segments, said resistance coils having their opposite sides located apart at different points of the periphery of the armature at which the two corresponding sides of two adjacent resistance coils are subject to the same strength of opposite fields of said main field—and auxiliary poles when said coils are short circuited by the brushes whereby equal electro-motive forces are induced in the corresponding sides of said adjacent resistance coils which neutralize each other in the short circuit, whereby owing to the high resistance of these coils commutation is aided and whereby these resistance coils assist the armature coils as active conductors.

RUDOLF RICHTER.

Witnesses:
HENRY HASPER,
WILLIAM MAYNER.

---

Copies of this patent may be obtained for five cents each, by addressing the "Commissioner of Patents, Washington, D. C."